Aug. 19, 1969    R. L. DE MONTEBELLO    3,462,213
THREE-DIMENSIONAL OPTICAL DISPLAY APPARATUS
Original Filed June 18, 1965    6 Sheets-Sheet 1
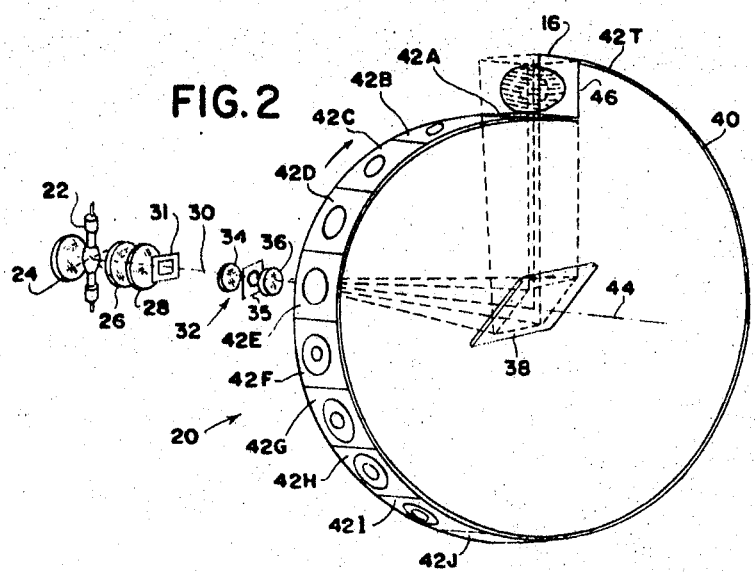
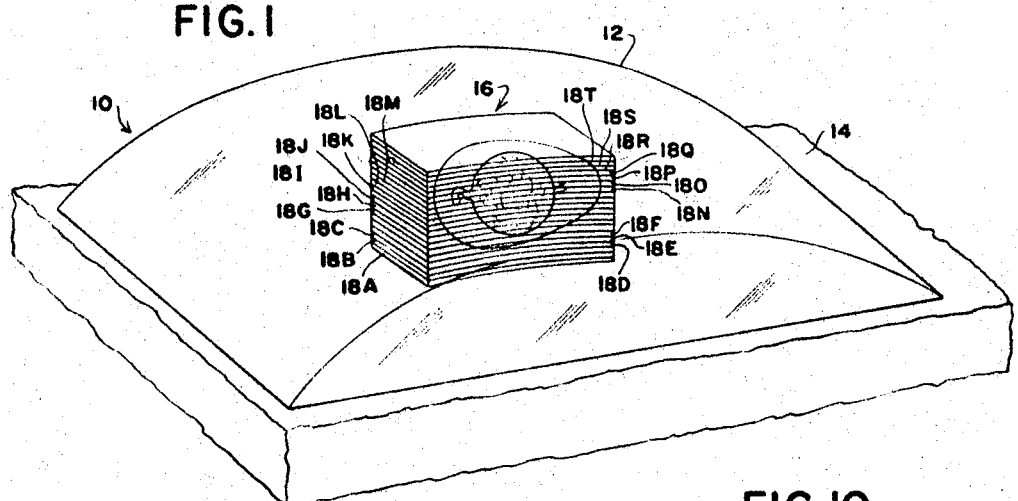
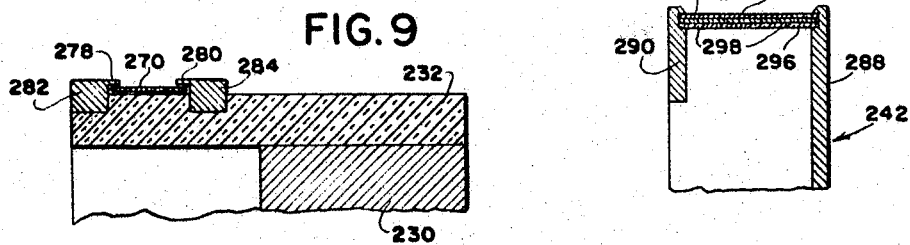

Aug. 19, 1969  R. L. DE MONTEBELLO  3,462,213
THREE-DIMENSIONAL OPTICAL DISPLAY APPARATUS
Original Filed June 18, 1965  6 Sheets-Sheet 2

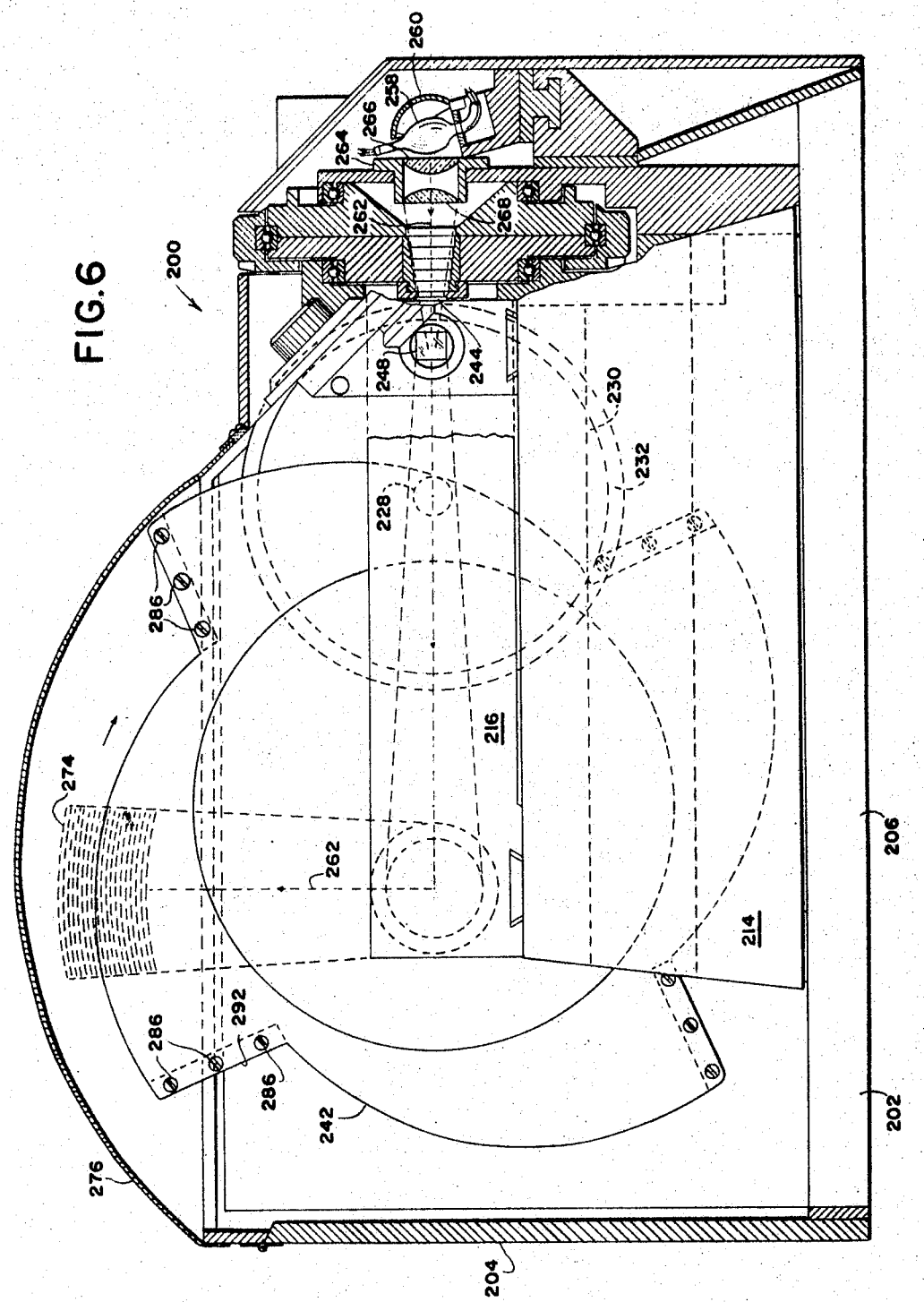

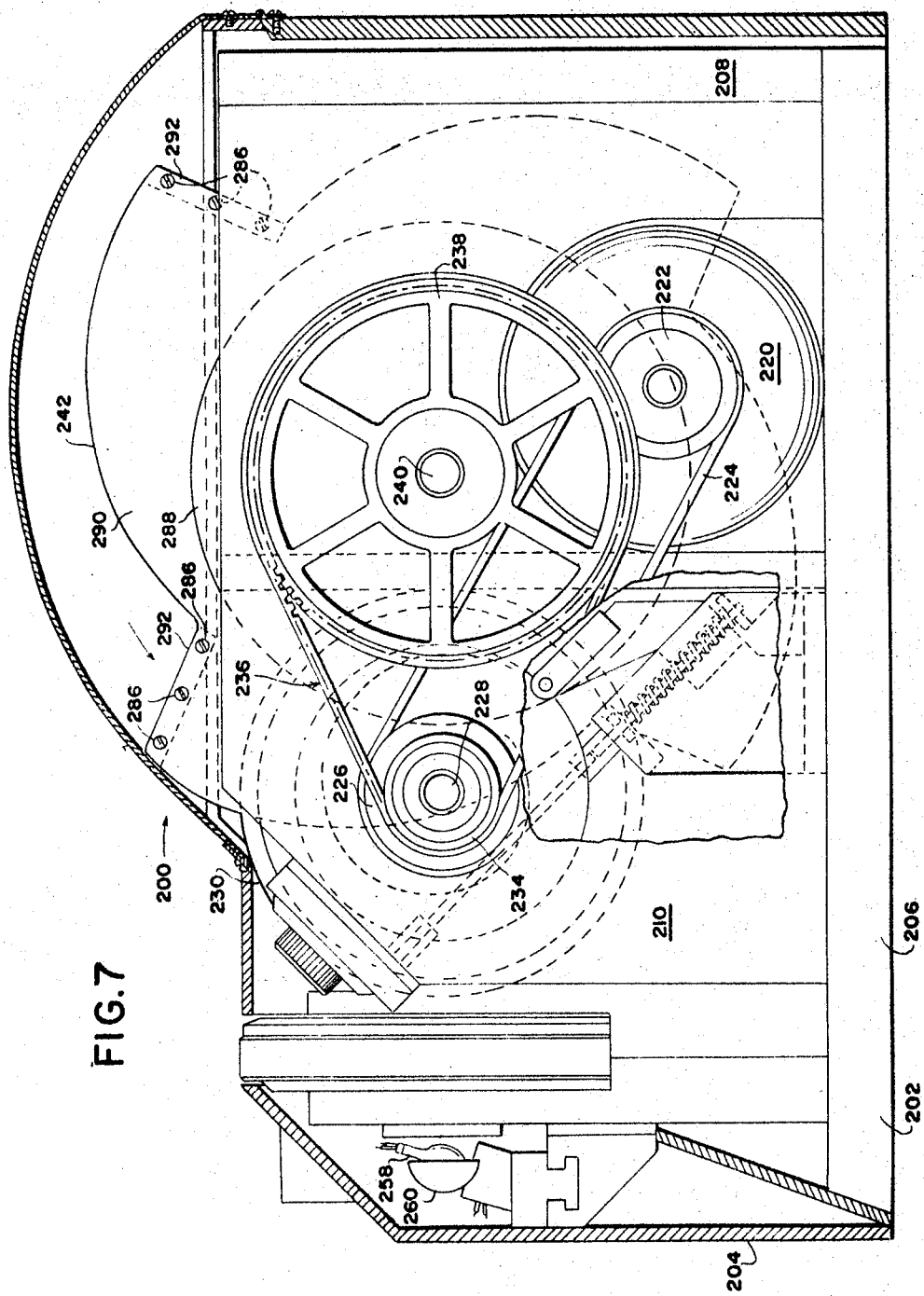

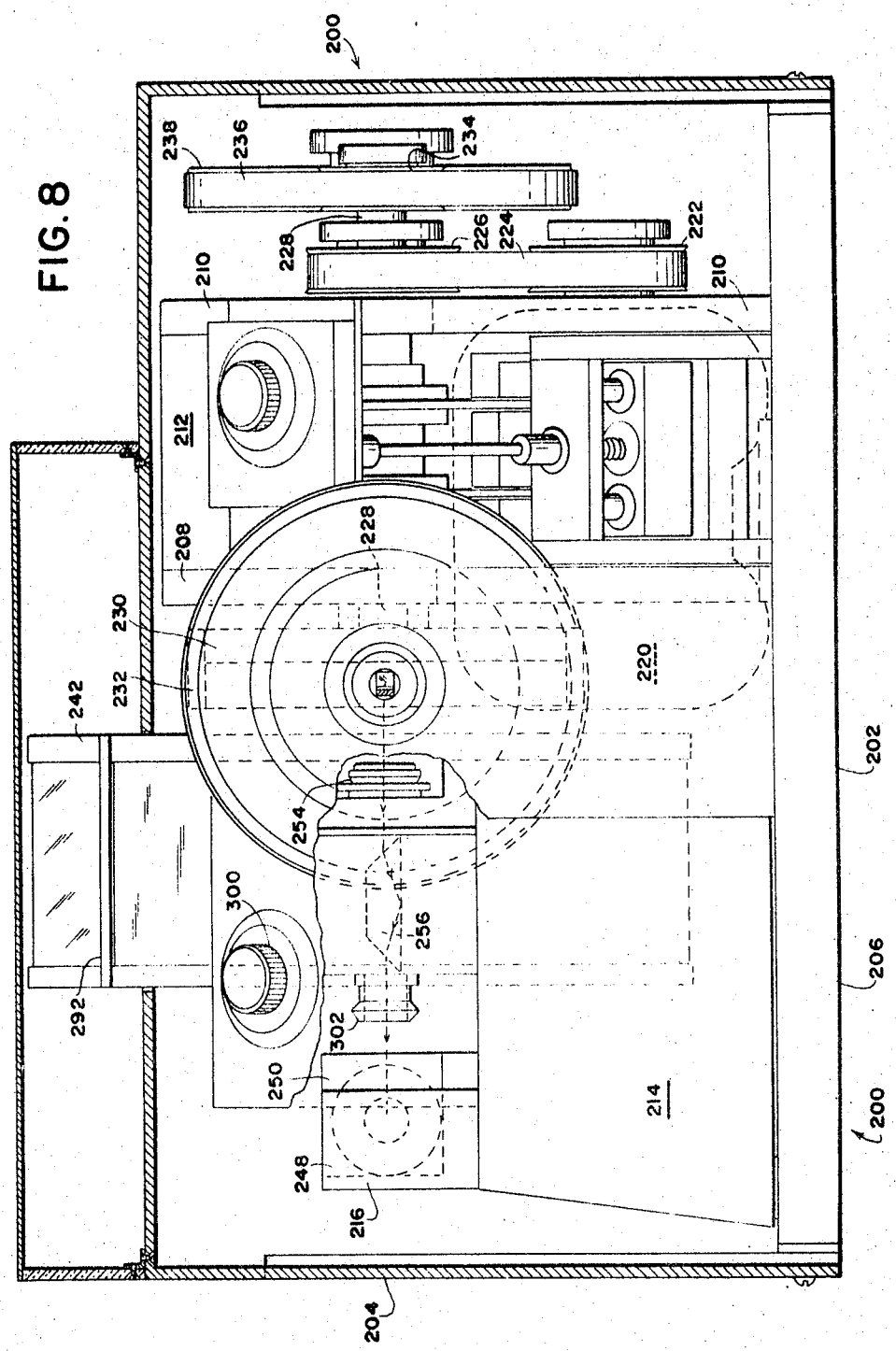

3,462,213
THREE-DIMENSIONAL OPTICAL DISPLAY
APPARATUS
Roger Lannes De Montebello, 54 Blvd. Flandrin,
Paris 16e, France
Continuation of application Ser. No. 464,937, June 18, 1965. This application Aug. 26, 1968, Ser. No. 746,597
Int. Cl. G02b 21/26
U.S. Cl. 352—86                                                   5 Claims

ABSTRACT OF THE DISCLOSURE

Apparatus for forming and displaying a three-dimensional image of a three-dimensional object. A plurality of two-dimensional photographs of successive sections of the object are prepared and are arranged in a relationship corresponding to that of the successive sections of the object. The photographs are moved through an optical path in a predetermined order and at a predetermined rate and are illuminated successively. A projection screen located in the optical path has a spiral, helical or other configuration so proportioned that, as the screen revolves, its image receiving surface successively occupies locations substantially normal to the projection beam and uniformly spaced from each other so that the images of the individual sections, when sequentially projected in suitably short flashes, appear to have the same relative orientation in space as the corresponding sections of the object.

---

This is a continuation of my patent application Ser. No. 464,937 filed June 18, 1965, now abandoned.

The present invention relates to a method and apparatus whereby serial sections or strata through an object are recorded photographically, or otherwise reproduced, in one or more steps and displayed in their natural sequence and respective orientation as a composite three-dimensional image.

More particularly the invention relates to novel methods of, and apparatus for direct observation of the three-dimensional image as an optical transparent solid and/or for conventional or stereoscopic photographic recording of the three-dimensional image and subsequent observation.

In the present invention two-dimensional information is displayed in such a way as to take on a three-dimensional and transparent character. The information fed into the apparatus is in the form of X–Y functions which are thereafter oriented along a Z axis. By X–Y functions are meant two-dimensional bits of information which are defined by their X and Y coordinates in one plane. These X–Y functions are connected in concept to one another by having common orientation along a Z axis. The entire fund of information is then displayed with the X, Y and Z axes (and the corresponding X–Y, Y–Z, and X–Z planes) in substantially their original relative position to one another.

The invention is thus distinguished from prior art devices in which information is displayed based on orientation with a point or plane or axis, or one of them, occurring outside the bit of information, or the total fund of bits of information, which are utilized to produce a three-dimensional image from two-dimensional bits of information.

The term "photographic" here is meant to encompass light sensitive means, as well as, magnetic and electronic means of still and animated image recording, etc., and by "photograph" is meant the product of such recording. The word "section" is applied generally to physical planar specimens (as obtained, for example, with a microtome), or to reproductions thereof; also to photomicrographic, radiographic, ultrasonic and other records of thin strata brought to "focus" within uncut specimens. (In high power microscopy, only very thin layers within a specimen can be observed at a time, in view of the exceedingly shallow depth of field available at high magnifications; similarly, in roentgenology, the known methods of "tomography" or "laminagraphy" provide records of serial strata within a living organism, which are closely comparable in nature to photomicrographic strata records.) The term "section" is applied also to drawings or other graphic representations of strata through real or imaginary objects, to elements of time sequences (motion pictures, cathode ray tube screen images, etc.) to elements of tri-coordinate functions, such as may be obtained from computers and, in general, to two-dimensional components of three-dimensional objects. For convenience, the invention will be described with regard to concrete solid objects.

It is known that, once a series of sections have been obtained from a specimen, for example in biological or anatomical study, researchers often find it difficult, when inspecting the sections individually, to visualize in three dimensions the spatial relationship existing among structural details. In those cases, the researcher is compelled to somehow rearrange the sections in space in their natural order. This may be achieved either in abstract fashion by computation, or concretely by physically or optically "stacking" the sections themselves, or their images, or reproductions thereof.

A number of methods have been developed for the physical stacking of enlarged photographs or drawings of the sections, on plastic, glass, or wax sheets, or the like. Such methods are tedious, lengthy (taking from weeks to months), and the results are usually frustrating; the sections are either too few or too numerous; when they are too few, interpolation is difficult and uncertain; when their number is increased, the accumulation of many sections interferes with the direct overall observation, either because of density addition and turbidity or because of refraction within the material, which further limits the visibility and distorts the inner structural detail.

Optical stacking does not present the same problems, and devices have been proposed for optical stacking in microscopy. In the latter devices, the stage or the objective is "vibrated" with such frequency and amplitude that the resulting sequence of aerial images of the strata successively brought to focus is projected onto a small screen which also vibrates. The vibration phases, respectively, of the objective or stage, and of the screen, are adjusted in such a way that the screen moves in unison with the objective or stage, but with greater amplitude. Thus, a "smear" solid image of the specimen is built in the space swept by the moving screen. This proposition has met with some serious obstacles, for example, lack of contrast, and flare due to magnification and to the background brightness, as well as the considerable light scattering caused by the relative thickness of the specimen, all of which severely degrade the compound image. Various authors have proposed means for optically generating a solid by causing to rotate or reciprocate an image receiving surface, thereby causing this surface to sweep a volume of space while a series of images is formed thereon, but without success.

It is an object of the present invention to provide a method and apparatus for displaying in space, in their natural spatial relationship, and sequentially, images of at least part of a series of sections, following a cycle having a frequency and an amplitude such that a three-dimensional, transparent image of the series may be formed, by conversion of the time coordinate into a space coordinate; the three-dimensional image is capable of being directly observed without the refractive distortions and other interferences characteristic of physical stacking, and is also capable of being photographically recorded.

It is another object of this invention to provide a screen whose motion is of such nature as to encounter a minimum of air resistance, thereby eliminating the need for evacuation sometimes found in the prior art.

It is another object of this invention to provide a method and apparatus for displaying internal information of a three-dimensional object so as to show the true rather than the apparent or perspective relationship of its elements and in such manner that the image may be viewed from any point of a substantially full hemisphere.

It is still another object of this invention to provide an improved film transport apparatus for use in the three-dimensional display of serial two-dimensional information.

It is a further object of this invention to provide a method and apparatus for the coordination of bits of two-dimensional information for display in three-dimensional form, which coordination is based on the orientation of the two-dimensional information with regard to points, planes or axes occurring within the two-dimensional information bits.

Other objects, features and advantages of the invention will appear from the detailed description of an illustrative form of the same, which now will be given in conjunction with the accompanying drawings, in which:

FIGURE 1 is a schematic perspective view of a portion of the apparatus illustrating a three-dimensional image reconstructed from sections of a solid specimen by the method and apparatus of the present invention;

FIGURE 2 is a schematic view of one embodiment of the present invention;

FIGURE 6 is a cross-sectional view of the apparatus of FIGURE 5 taken generally along lines 6—6 of FIGURE 5;

FIGURE 7 is a cross-sectional view of the apparatus of FIGURE 5 taken generally along lines 7—7 of FIGURE 5;

FIGURE 8 is a front elevational view, from the operator's position of the apparatus of FIGURE 5 taken generally along lines 8—8 of FIGURE 5;

FIGURE 9 is a detail view taken generally along lines 9—9 of FIGURE 5; and

FIGURE 10 is a detail view taken generally along lines 10—10 of FIGURE 5.

Figure 4:
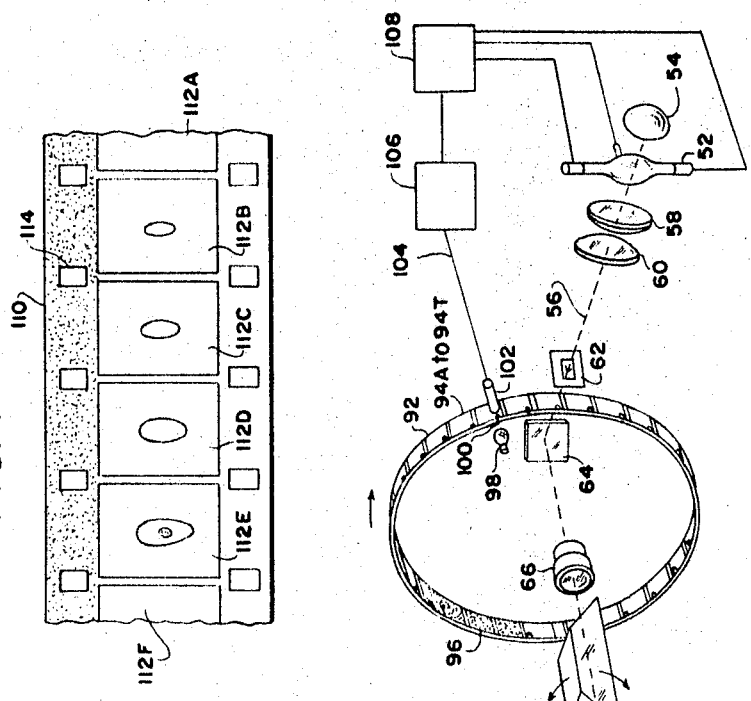
FIGURE 4 is a plan view of a portion of a perforated film strip useful in the present invention showing a partial series of reproductions of sections through a specimen.

The objects of this invention may be accomplished by preparing a plurality of two-dimensional photographs of successive sections of a three-dimensional object, and arranging the photographs in apparatus adapted to display them in a coordinated manner. The apparatus is capable of a number of embodiments having the following elements in common: an optical system made up of lenses, prisms, mirrors, etc., and defining an optical path, a plurality of two-dimensional photographs arranged to pass through the optical path, and a light source adapted to illuminate each photograph as it is centered in the optical path. The illuminated photographs may be mounted on a suitable viewing screen for direct viewing, but preferably their images are projected onto a projection screen. The viewing screen may be clear or diffusing so long as it permits light to pass through to illuminate the photograph which may be self-diffusing or clear. The projection screen must have a diffusing surface in order to display an image. In all embodiments the screen surface must move back and forth along the optical path. Some of the embodiments differ from others in the means to accomplish such motion.

The photographs are synchronized with the motion of the screen so that the photograph of one extreme section is displayed on the screen surface at one extreme of its travel, and the photograph of the other extreme section is displayed on the screen at the other extreme of its travel, with the photographs of intermediate sections displayed at appropriate points between the two extremes of screen travel. The photographs used in the practice of the invention may consist of individual two-dimensional still pictures of a three-dimensional object, such as a biological specimen, taken as it is dissected layer by layer. Each individual photograph is a reproduction of a distinct section, preferably planar, of the object. The photographs are preferably arranged in a holder so that successive photographs are reproductions of successive layers of the object. It is to be understood that a loop of motion picture film may be substituted for individual photographs mounted in the holder, and projecion apparatus may be used to display them successively on the screen. However, it may be abusive and impractical to submit a film loop to the severe frictional and other stresses associated with very high speeds if a conventional driving mechanism, such as a sprocket, is utilized. It is a feature of the present invention that mechanical friction and other stresses may be virtually eliminated by tightly holding the film on the inner or the outer surface of a rotating, transparent drum. Similarly, for longer film strips the film may be held on a transparent flexible belt provided with sprocket holes or with ridges for enmeshing sprocketed pulleys.

An electronic multiple microflash tube may be used to achieve high-frequency projection, in some advantageous embodiments up to about 1200 or more light pulses per second. For best results the light pulse persistence is of short enough duration visually to substantially "stop" each successive frame, for instance, one microsecond. The series of the film's sprocket holes, or a like pattern, may be used to trigger synchronously the flash tube.

The images are displayed or projected in sequence on a screen having a surface sufficiently diffusing to permit observation even at grazing angles without excessive drop in luminance. The screen is dynamic, i.e., its surface plane is displaced back and forth along the optical path, although its physical surface may travel in a direction substantially at right angles to the optical path. This scanning or "sweeping" motion of the surface plane is made synchronous with the sequence projection, and the scan amplitude and uniformity are such that the successive frames occupy successive positions on the screen surface which are uniformly positioned spatially and temporally. When the cycle is repeated with sufficient frequency, the cerebral cortex, owing to retinal image retention, perceives each image continuously and the sequential projection as a three-dimensional continuum whose component layers (the separate sections) appear simultaneously present in their natural order and spacing. For best results each image is repeated at least twelve times per second, preferably at least thirty times per second. Below these frequencies a more or less noticeable flicker occurs depending upon the brightness and the nature of the images and may interfere with satisfactory observation of the image.

A preferred embodiment of the projection screen is a spiral wheel, or an "Archimedes wheel," and consists of a modified cylinder rotating about an axis within the cylinder. The distance between the axis of rotation and the periphery of the wheel, uniformly increases from a minimum to a maximum; the maximum peripheral distance is adjacent the minimum, but about 360° removed in the direction of rotation. There is a sharp step from the maximum to the minimum position in the direction of rotation. The radial distance between a point half an image-diagonal away from the maximum dimension and a point half an image-diagonal away from the minimum dimension substantially equals the height, or third dimension (or Z coordinate), of the image to be produced. The periphery of the wheel is, in several advantageous embodiments, made of frosted glass or plastic and acts as a projection screen.

On a spiral projection wheel, the images of the successive photographs on the surface lie in mutually overlapping curved planes located respectively farther and farther from the axis of rotation (or closer and closer, according to the direction of rotation) thus each axially extending surface unit area is at a distance from the axis of rotation, different from the distances of all other axially-extending surface unit areas. This results in the optical illusion that the two-dimensional images of the photographs are situated in space, one above the other, in their original, natural relationship. The curvature of the wheel is usually of little significance provided that the ratio of the mean radius vector to the frame width is kept sufficiently large.

In other embodiments instead of a spiral, the screen surface may alternatively follow a multiple spiral, or any other suitable curve designed for preferably constant and uniform back and forth motion along the optical path, or may be a helix, or a reciprocating flat screen, etc. In the case for example of two opposedly oriented spirals on a single wheel, as also in the case of a reciprocating screen, to each complete rotation, or cycle, of the screen correspond two complete sequences of photographs, and these must be positioned on the film drum in such manner as to insure their close coincidence in the space-time solid: i.e., the photographs of the one strip are arranged in the reverse order of the photographs of the other although in the same orientation, unless only one-half cycle is used.

When the projection screen is in the form of a helix, the screen may be arranged about an axis of rotation with each radially extending unit surface area of the screen substantially at a right angle to the axis of rotation. The optical path, at least the portion of it impinging on the screen, may be substantially parallel to the axis of rotatation. The helix preferably extends for about 360° about the axis, with the two ends spaced apart along the axis a distance substantially equal to the height of the image to be produced. Thus projection of successive frames on appropriate and overlapping portions of the helix produces the illusion of a three-dimensional image in space according to the same principle applied in the case of the spiral screen. Multiple helices may be utilized.

The projection screen may be flat and made to reciprocate with a stroke or cycle coinciding with the movement of the photograph through the optical train. As each frame is centered in an optical path, stroboscopic light is projected through the photograph and onto a screen which is moved reciprocally at right angles to its plane of orientation and along the optical path. The speed of reciprocation may be synchronized with the speed of the movement of the photographs. Again, the illusion of a three-dimensional image standing still in space is created.

The invention comprises the process involving the several steps and the relation in order of one or more of such steps with respect to each of the others, and the apparatus possessing the construction, combination of elements and arrangements of parts which are exemplified in the following detailed disclosure, and the scope of whose application will be indicated in the claims.

FIGURE 1 illustrates schematically a three-dimensional image of a three-dimensional object as would be seen by a user of the apparatus of this invention. The apparatus 10 is shown in part to be comprised of a transparent window 12 set in a frame 14. A three-dimensional image 16 is shown to be comprised of a plurality of two-dimensional images 18A through 18T of reproductions of sections through a specimen, for instance an egg. The images are aligned, one above the other. Each image is produced by a transparent photograph of a layer of the three-dimensional object. Image 18A is an image of the reproduction of the lowest layer of the specimen, image 18B, the next higher, and so on, image 18T being an image of the reproduction of the highest layer of the specimen.

FIGURE 2 shows schematically one embodiment of apparatus for producing three-dimensional images in which photographs are mounted on the surface of a transparent spiral screen wheel and viewed directly. The apparatus 20 comprises a lamp 22 connected to an outside source of electrical power, not shown. A mirror 24 reflects light through lenses 26, 28 which collimate the light along an optical path 30 through a gate 31. A projection lens 32, made up of component lenses 34 and 36 and aperture 35, focuses the light passed by the gate 31 so that the light passed by the gate, after being reflected from a mirror 38, falls onto a predetermined portion of a spiral wheel 40. The wheel 40 is arranged to rotate about an axis 44 by well-known means, not shown. The wheel 40 has mounted on its surface a plurality of serial two-dimensional photographs 42A through 42T. The framed light incident on the surface of the wheel 40 illuminates selectively each of the photographs in turn. In operation the lamp 22 is arranged to flash at predetermined intervals such that one of the photographs 42A–42T is centered in the optical path at the time of the flash.

The wheel is rotated in the direction of the arrow shown in the drawing and successive photographs are each illuminated for a brief instant by the flash of the lamp. The axis of rotation 44 of the wheel is fixed. The distance between the axis of rotation 44 and each successive reproduction 42A–42T increases slightly. Thus each successive photograph produces an image slightly above the previous one in the direction of rotation, and one complete rotation of the wheel 40 results in the production of a three-dimensional image 16. The step 46, or discontinuity, in the wheel marks the beginning and end of a cycle. The frames must be large enough to convey the desired information by direct viewing, and the wheel surface, or the film base, provided with a diffusely transmitting medium.

The advantages of this arrangement, simplicity, and the direct vision of the photographs allowing all details to be preserved, are offset however, first, by the fact that the dimensions of the three-dimensional image are directly related to those of its components, the serial photographs, and second, that the wheel's size and surface speed have to be very large in proportion to the three-dimensional image size. A three-dimensional image composed of sixty, three by four inch photographs requires a wheel diameter of over six feet with a surface speed of over 20,000 feet per minute, as opposed to about 650 feet per minute for the four spiral projection screen wheel, described below.

Figure 3:
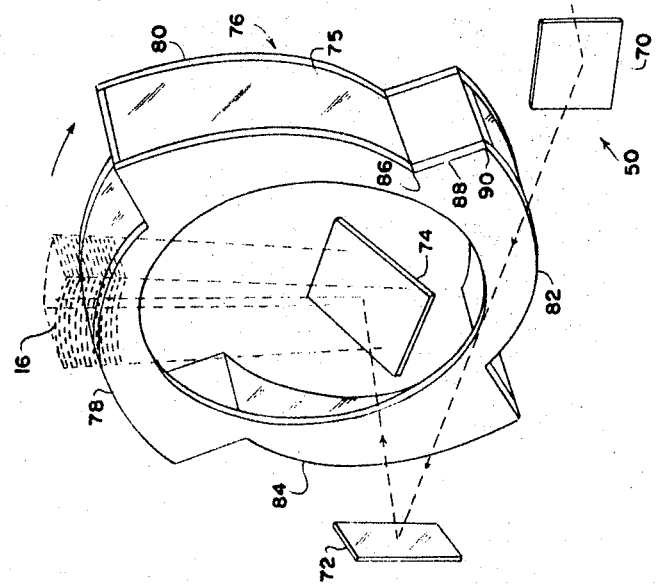
FIGURE 3 is a schematic view of another embodiment of the present invention.
Figure 5:
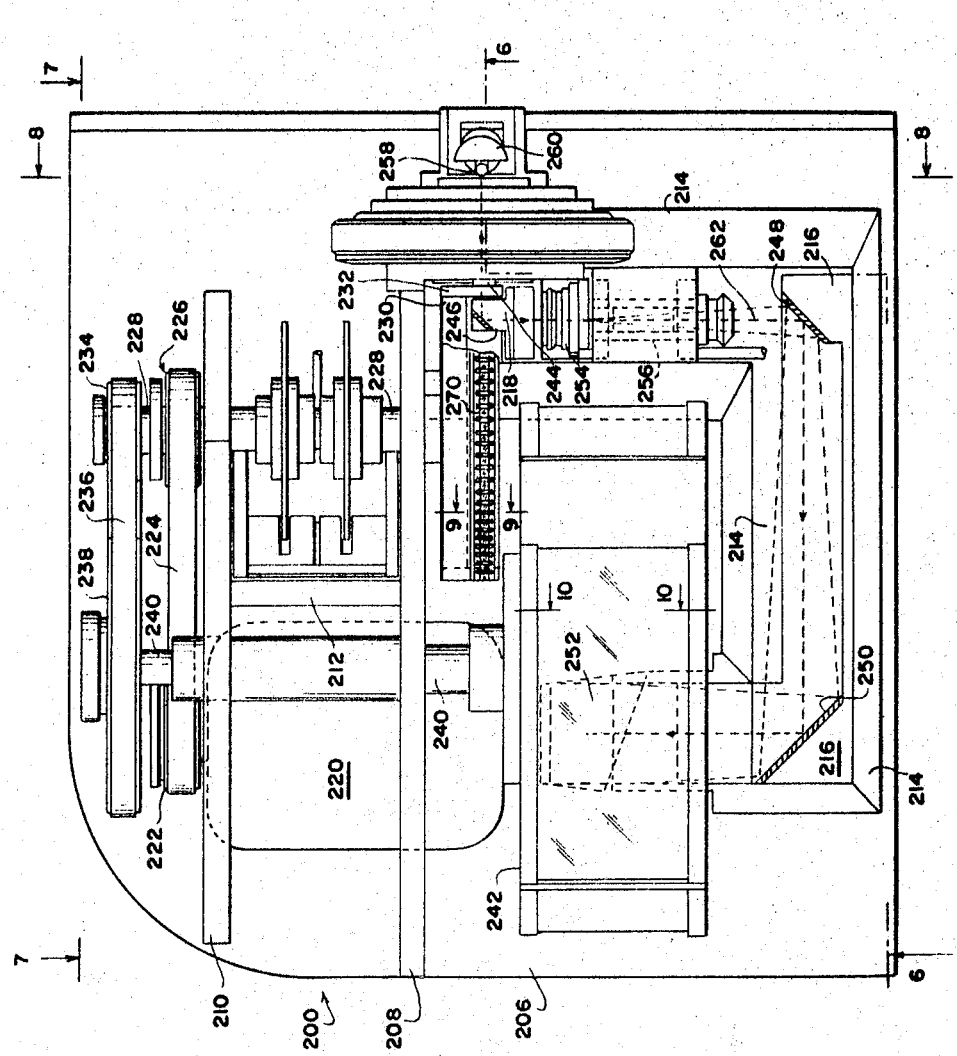
FIGURE 5 is a plan view of apparatus embodying the principles of this invention.

FIGURE 3 schematically illustrates an alternative embodiment. In the apparatus 50, light from a lamp 52 is reflected by a mirror 54 along an optical path 56 and passes through condensing lenses 58 and 60. The light passes through a gate 62 and is reflected by a mirror 64 through a projection lens 66.

The light may be reflected through a series of mirrors 70, 72, 74, as may be required for the particular configuration of the apparatus. The light then strikes the surface of a spiral screen wheel 76 which is made up of a plurality of segments 78, 80, 82 and 84, each covered with a translucent material and each similar to the other and varying from a low point 86 at the base of a step 88 to a high point 90 at the top of the next succeeding step.

A circular drum 92 is disposed in the optical path, for instance between the gate 62 and the mirror 64 as shown in the drawing, and has on its surface a plurality of serial, transparent photographs 94A through 94T of object sections.

The images of the sequential photographs 94A–94T are projected, superimposed, on the rotating spiral screen wheel 76. The stroboscopic lamp 52 is arranged to flash successively when successive photographs 94A–94T are centered in the optical path 56. In all such embodiments the screen and wheel are synchronized so that the reproductions of the lowest sections of the object are projected onto the short radius portion of the screen, the reproductions of the highest sections on the long radius portion, with the remainder respectively located between them. Both the drum and screen are rotated at high speed. The light that passes through each frame is projected onto the screen producing a series of images that appear in a three-dimensional stack. As the screen wheel 76 rotates, it will be understood that the spiral surface appears constantly rising (or constantly falling, according to rotation direction), and therefore that the series of projected frames always travels in the same direction; any one complete frame sequence coincides w ith one complete drum revolution, and the flash-projected frames are successively "stopped" or "frozen" on successively higher (or lower) levels. The illusion is created that the three-dimensional object is being seen in its entirety at one time.

A number of spaces 96 are blacked-out. The blacked-out spaces 96 correspond to the passage of the steps in the spiral wheel through the three-dimensional image. If useful projection were effected during this passage, the resulting three-dimenisonal image 16 would be split in two, part of each section falling on the low end of a spiral and the other part on the high end of the next spiral. In one advantageous form of this embodiment, seventy-five percent of the drum surface may be covered with useful photographs, and about twenty-five percent blacked-out.

For those rare cases where ambiguity might arise from the curvature of the screen wheel 76 owing to the particular morphology of some subjects, the projection apparatus of the invention may be provided with a dove prism 68 in the optical path. The dove prism 68 affords rotation of the three-dimensional image about the projection axis, thereby, in effect, changing the direction in which the curvature of the wheel distorts the image so as to substantially eliminate the distortion from certain cross-sections.

Such rotation is also useful for photographic or cinematographic recording or for group demonstartions. Similarly, it facilitates inspection of the three-dimensional image by the operator without moving from his place.

As shown in FIGURE 3, the screen may be made with a plurality of spirals so that more than one cycle appears for each full rotation of the screen. In such an embodiment, which has the advantage of reducing noise and vibration to a minimum, the curvature of the screen surface may preferably be a composite of two or more (four being illustrated) equally oriented, identical segments of spirals; the screen speed is then synchronized so as to be a fraction of the speed of the film drum corresponding to the number of spiral segments. This form provides a naturally well-balanced drum, which rotates at a substantially reduced speed and affords a desired reduction in noise, vibration, wear, etc. A limiting factor in the practical number of spiral segments is the degree of curvature of the spiral segments, as a function of the acceptable degree of curvature of planes in the synthesis; another limiting factor corollary to the preceding one, is the possible height of the synthesis, which decreases with the increase of the number of segments, itself a function of the degree of curvature.

One practical set of parameters consists of a 16 mm. film srtip having 60 to 70 photographs and mounted on a 4.5 inch radius transparent drum. The screen is composed of four spiral segments having a useful width of five inches and radius vector lengths of nine to twelve inches. The projected image is about three inches by four inches and produces a three-dimensional image about two inches high.

The film drum rotation rate may be as little as 1200 r.p.m. Such a rotation rate provides 20 sequences per second, each sequence corresponding to a stroke of one of the spiral segments, and therefore also corresponding to a complete build-up of three-dimensional image, which may include, for the film drum size indicated, about sixty photographs corresponding to a spatial frequency of 30 sections per inch and a flash frequency of 1200 (20 times 60) cycles per second, each flash peak duration being of the other of a microsecond. It has been found that a xenon contact arc lamp, such as manufactured by the Hanovia Company as Model No. DL–5022–100 provides sufficient illumination for a synthetic solid image having a length of four inches and a width of three inches to be comfortably examined at substantially photopic level in a subdued ambient light. The four spiral screen wheel rotates at one-fourth of the film drum speed, that is, 300 r.p.m.

The triggering of the flash of the lamp 52 may be accomplished by passing light from an exciter lamp 98 through and indexing hole 100 on the surface of the film drum 92 onto a photo-receptor 102 which converts the light pulse into an electrical pulse that is carried by conduit 104 to a signal amplifier 106 and then to a high voltage power supply 108 which triggers the lamp.

Intense flashes of white light may be produced by the arc discharges of the stroboscopic lamp 52 which may be a xenon tube. For efficient operations of such a triggering device the area between the indexing holes is preferably opaque. Where a motion picture film strip is used as the series of photographs on film drum 92, the sprocket holes may be utilized as a light chopper.

The photographs 94A–T and the gate 62 have been shown spaced some distance apart but it is to be understood that they must be relatively close to each other in order that they will be sharply focused by lens 66 on surface 75.

For best results, the lens 66 provides considerable depth of field and of focus. To this effect the lens desirably has a relatively small aperture in order that the solid angle that the aperture subtends at the film and gate, on the one hand, and at the mid-point of the screen travel, on the other, be sufficiently small to cause insignificant spread of the circle of confusion in planes closer to and father from the middle plane. This latter does not affect the light efficiency because the lamp 52 may be focused so as to substantially fill only the entrance pupil of lens 66.

FIGURE 4 shows the relative placing of the photographs on a carrier. The carrier 110 may be a film strip having successive two-dimensional photographs, 112A through 112F, corresponding to successive sections of the object to be reproduced in three-dimensional image form. The carrier 110 is provided with indexing holes 114, which serve, as described above, to trigger the stroboscopic lamp pulses. The area between the holes is preferably light-exposed and processed to a high density so that it reaches a maximum of opacity and contrast with the holes. While FIGURE 4 is described with relation to a film strip, it is to be understood that the base may be made of transparent glass or plastic on which successive photographs are mounted by well-known means, such as mechanical devices or adhesives. Also, where a film strip is used it may be mounted on a wheel, such as the wheel 92 for rigidity and strength.

Referring now to FIGURES 5 through 10, the embodiment fo FIGURE 3 will be described in more detail. The apparatus shown generally as 200 is made up of a frame 202 and a housing 204 connected to the frame and surrounding the operable portions of the apparatus in order to protect them and to present a pleasing appearance.

The frame 202 is comprised of a base 206 which may be made of a thick aluminum plate, which is 1½ inches thick in one advantageous embodiment. Structural members 208, 210 and 212 are connected to the base 206, for instance by bolting, and may be comprised of aluminum, which is one inch htick in one advantageous embodiment. Optical bench members 214, 216 and 218, which may be cast aluminum, are mounted on the base 206.

A motor 220 is supported on the base 206. The motor 220, by means of a timing pulley 222, a timing belt 224, and a timing pulley 226, drives a shaft 228 on which is mounted a film drum 230 having a transparent cylinder 232, made, for instance, of a clear plastic, such as methyl methacrylate, and being ¼ inch thick in one advantageous embodiment. The cylinder is fitted on the periphery of the drum 230 and overhangs on the side opposite the motor. On the same shaft 228 is mounted a timing pulley 234 which by means of a timing belt 236 and timing pulley 238 drives a shaft 240 on which is mounted a screen drum 242. The pulley 238 has four times more timing notches than the pulley 234 in order to achieve a speed one-fourth that of pulley 234. That is, the ratio of the size of pulley 238 to pulley 234 is 4:1. The shafts 228 and 240 are rotatably fastened to the structural members 208, 210 and 212.

Mounted on the optical bench composed of members 214, 216 and 218 is a gate 244 and a succession of mirrors 246, 248 250 and 252, and lens 254 and a dove prism 256 which together define an optical path 262. Light from a stroboscopic lamp 258 is reflected by reflector 260 along the optical path 262 and passes through a condenser lens 264 made up of component lenses 266 and 268. The light passes through one of the photographs 270 on the film drum 230 and is reflected by the mirror 246 through the lens 254 and the mirrors 248, 250 and 252 onto the diffusing screen wheel 242 where, due to the rotation and timing of the components, a three-dimensional image 274 is produced inside a clear plastic dome 276 mounted on the housing 204.

The structure of the film drum 230 is shown in cross-section in FIGURE 9 where it is seen that the reproductions 270 are held down under the lips 278 and 280 of circular rings 282 and 284. In one advantageous embodiment the lips are thin, being machined in hard metal, such as spring steel, to about .004″ and being sufficiently narrow to retain enough strength to hold down the film. The lips are thin so that the film may be as close as possible to the gate.

As seen in FIGURES 7, 8 and 10, the disc 288 and ring 290 which constitute the outer faces of the screen wheel 242 are held in place by means of four flat rectangular plates 292 secured by screws 286. The disc 288 of the wheel is mounted on the shaft 240 by means of a hub.

Before attaching the plates 292, sheets 296 of transparent material, such as clear acrylic plastic, which in one advantageous embodiment are about ⅟₃₂″ thick, are inserted in pairs in grooves 298 (FIGURE 10). Between the sheets 296 are inserted one each of four sheets of thin, about .004 inch thick, diffusely transmitting material 299, which constitutes the screen surface proper.

The dove prism 256 may be rotated by rotating control knob 300 (FIGURE 8). The control knob 300 is connected by a shaft and gear (not shown) to gear 302 which is connected to the dove prism 256.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. For instance, the invention has been described with regard to transparencies and the apparatus arranged for transmission of light through the transparencies. However, opaque photographs may be used and viewed or projected by use of reflected light techniques. Furthermore, a plurality of optical paths may be used, particularly in connection with the helix embodiment, in order to display a plurality of three-dimensional images simultaneously.

What is claimed is:
1. Apparatus for forming and displaying a three-dimensional image of a three-dimensional object comprising:
(a) a series of two-dimensional photographs of successive sections of said object, said photographs being arranged in a predetermined order with regard to a relationship that said successive sections of said object bear to each other;
(b) an optical system defining an optical path, said optical path having an end portion;
(c) means to illuminate successively each of said photographs along said optical path;
(d) a projection screen disposed in said optical path and being adapted to move along said optical path nearer to and farther from said series of said photographs as successively illuminated, said projection screen having a surface formed as a spiral rotatable about its axis which is disposed substantially at right angles to said end portion of said optical path; and
(e) means to move said photographs through said optical path in said predetermined order and at a predetermined rate in synchronization with rotation of said projection screen whereby each of said photographs is successively projected onto said projection screen to create said three-dimensional image of said object.

2. Apparatus for forming and displaying a three-dimensional image of a three-dimensional object comprising:
(a) a series of two-dimensional photographs of successive sections of said object, said photographs being arranged in a predetermined order with regard to a relationship that said successive sections of said object bear to each other;
(b) an optical system defining an optical path, said optical path having an end portion;
(c) means to illuminate successively each of said photographs along said optical path;
(d) a projection screen disposed in said optical path and being adapted to move along said optical path nearer to and farther from said series of said photographs as successively illuminated, said projection screen having a surface formed as a multiple segment spiral rotatable about its axis which is disposed substantially at right angles to said end portion of said optical path, each segment of said spiral having a like configuration; and
(e) means to move said photographs through said optical path in said predetermined order and at a predetermined rate in synchronization with rotation of said projection screen whereby each of said photographs is successively projected onto said projection screen to create said three-dimensional image of said object.

3. Apparatus for forming and displaying a three-dimensional image of a three-dimensional object comprising:
(a) series of two-dimensional photographs of successive sections of said object, said photographs being arranged in a predetermined order with regard to a relationship that said successive sections of said object bear to each other;
(b) an optical system defining an optical path, said optical path having an end portion;
(c) means to illuminate successively each of said photographs along said optical path;
(d) a projection screen disposed in said optical path and being adapted to move along said optical path nearer to and farther from said series of said photographs as successively illuminated, said projection screen having a surface formed as a helix rotatable about its axis which is disposed substantially parallel to said end portion of said optical path; and
(e) means to move said photographs through said optical path in said predetermined order and at a predetermined rate in synchronization with rotation of said projection screen whereby each of said photographs is successively projected onto said projection screen to create said three-dimensional image of said object.

4. Apparatus for forming and displaying a three-dimensional image of a three-dimensional object comprising:
  (a) series of two-dimensional photographs of successive sections of said object, said photographs being arranged in a predetermined order with regard to a relationship that said successive sections of said object bear to each other;
  (b) an optical system defining an optical path, said optical path having an end portion;
  (c) means to illuminate successively each of said photographs along said optical path;
  (d) a projection screen disposed in said optical path and being adapted to move along said optical path nearer to and farther from said series of said photographs as successively illuminated, said projection screen having a surface formed as a multiple segment helix rotatable about its axis which is disposed substantially parallel to said end portion of said optical path, each segment of said helix having a like configuration, and
  (e) means to move said photographs through said optical path in said predetermined order and at a predetermined rate in synchronization with rotation of said projection screen whereby each of said photographs is successively projected onto said projection screen to create said three-dimensional image of said object.

5. Apparatus for forming and displaying a three-dimensional image of a three-dimensional object comprising:
  (a) series of two-dimensional photographs of successive sections of said object, said photographs being arranged in a predetermined order with regard to a relationship that said successive sections of said object bear to each other;
  (b) an optical system defining an optical path, said optical path having an end portion;
  (c) means to illuminate successively each of said photographs along said optical path;
  (d) a projection screen disposed in said optical path and being adapted to move along said optical path nearer to and farther from said series of said photographs as successively illuminated, said projection screen having a surface formed with a predetermined curvature around a rotatable axis which is disposed so that said end portion of said optical path is substantially normal to said surface; and
  (e) means to move said photographs through said optical path in said predetermined order and at a predetermined rate in synchronization with rotation of said projection screen whereby each of said photographs is successively projected onto said projection screen to create said three-dimensional image of said object.

References Cited

UNITED STATES PATENTS

| | | | |
|---|---|---|---|
| 1,488,027 | 3/1924 | Runcie | 352—43 |
| 2,010,307 | 8/1935 | Leishman | 178—6 |
| 2,361,390 | 10/1944 | Ferrill | |
| 2,444,729 | 7/1948 | Crockwell. | |
| 2,891,339 | 6/1959 | Kao. | |
| 3,077,816 | 2/1963 | Hirsch | 352—86 |
| 3,178,720 | 4/1965 | Collender. | |
| 3,201,797 | 8/1965 | Roth | 352—86 |

FOREIGN PATENTS

| | | |
|---|---|---|
| 757,481 | 10/1933 | France. |
| 1,087,040 | 8/1954 | France. |

JULIA E. COINER, Primary Examiner

U.S. Cl. X.R.

352—57